(12) United States Patent
Schaye

(10) Patent No.: US 12,403,827 B2
(45) Date of Patent: Sep. 2, 2025

(54) ENVIRONMENTALLY SEALED VISUAL DISPLAY ASSEMBLY AND PROCESS INCORPORATING INDIVIDUAL OR STACKED LED STRIPS, PROCESSOR AND ACCELEROMETER COMPONENTS

(71) Applicant: Pedestrian Safety Solutions, LLC, New York, NY (US)

(72) Inventor: Paul L. Schaye, Delray Beach, FL (US)

(73) Assignee: Pedestrian Safety Solutions, LLC, New York, NY (US)

( * ) Notice: Subject to any disclaimer, the term of this patent is extended or adjusted under 35 U.S.C. 154(b) by 56 days.

(21) Appl. No.: 18/404,966

(22) Filed: Jan. 5, 2024

(65) Prior Publication Data
US 2024/0246484 A1    Jul. 25, 2024

Related U.S. Application Data

(60) Provisional application No. 63/439,955, filed on Jan. 19, 2023.

(51) Int. Cl.
*B60Q 9/00* (2006.01)
*B60Q 1/26* (2006.01)
(Continued)

(52) U.S. Cl.
CPC .......... *B60Q 9/008* (2013.01); *B60Q 1/2623* (2013.01); *B60Q 1/2696* (2013.01); *B60Q 1/28* (2013.01); *B60Q 1/346* (2013.01); *B60Q 1/543* (2022.05)

(58) Field of Classification Search
CPC ........ B60Q 1/2665; B60Q 1/543; B60Q 1/54; B60Q 1/50; B60Q 1/5037; B60Q 1/52;
(Continued)

(56) References Cited

U.S. PATENT DOCUMENTS

| | | | |
|---|---|---|---|
| 7,084,935 B2 | 8/2006 | Mandler et al. | |
| 7,397,355 B2 | 7/2008 | Tracy | |

(Continued)

FOREIGN PATENT DOCUMENTS

| | | |
|---|---|---|
| BE | 1018959 A5 | 11/2011 |
| FR | 2947494 A1 | 9/2011 |

(Continued)

OTHER PUBLICATIONS

International Search Report and Written Opinion for Appl. No. PCT/US2024/010906 mailed May 21, 2024, 15 pages.

*Primary Examiner* — Wei (Victor) Y Chan
(74) *Attorney, Agent, or Firm* — Dinsmore & Shohl LLP

(57) ABSTRACT

A visual front alert system attached to a vehicle for instructing observers as to movement of the vehicle. A body incorporates a plurality of illuminating elements configured in a strip extending substantially the length thereof and communicating with a processor also integrated into the body and incorporating a motion control circuitry. A power supply operates the processor and illuminating elements. In response to a travel condition of the vehicle, the motion control circuitry outputs a signal to the processor which is representative of the vehicle movement, the processor in turn signals the illuminating elements to generate a visual output corresponding to the signal.

13 Claims, 3 Drawing Sheets

(51) Int. Cl.
*B60Q 1/28* (2006.01)
*B60Q 1/34* (2006.01)
*B60Q 1/50* (2006.01)
*B60Q 1/54* (2006.01)

(58) Field of Classification Search
CPC . B60Q 1/22; B60Q 3/258; B60Q 9/00; B60Q 2300/42; B60Q 2300/41
See application file for complete search history.

(56) References Cited

U.S. PATENT DOCUMENTS

| | | | |
|---|---|---|---|
| 8,917,171 | B2 | 12/2014 | Anderson et al. |
| 9,615,468 | B2 | 4/2017 | Moncrieff |
| 9,982,780 | B2 | 5/2018 | Salter et al. |
| 10,640,033 | B1* | 5/2020 | Gandhi ............... B60Q 1/122 |
| 10,810,932 | B2 | 10/2020 | Shao et al. |
| 10,981,496 | B2 | 4/2021 | Schaye |
| 11,014,492 | B2* | 5/2021 | Hence ............... B60Q 1/302 |
| 11,276,798 | B2 | 3/2022 | Hwang et al. |
| 11,346,523 | B2 | 5/2022 | Nicholson et al. |
| 11,507,229 | B2 | 11/2022 | Morioka et al. |
| 11,524,628 | B2 | 12/2022 | Takori et al. |
| 11,527,180 | B2* | 12/2022 | Milner ............... G09F 13/04 |
| 11,670,174 | B2* | 6/2023 | Mikuriya ............... G08G 1/09 |
| | | | 340/988 |
| 11,712,994 | B1* | 8/2023 | Schaye ............... B60Q 1/28 |
| | | | 340/467 |
| 12,054,095 | B2* | 8/2024 | Schaye ............... B60Q 1/56 |
| 2006/0125615 | A1 | 6/2006 | Song |
| 2006/0250229 | A1 | 11/2006 | Cheng et al. |
| 2014/0354422 | A1 | 12/2014 | Olson et al. |
| 2015/0323149 | A1 | 11/2015 | Salter et al. |
| 2015/0354792 | A1* | 12/2015 | Chien ............... F21V 17/002 |
| | | | 362/645 |
| 2019/0143888 | A1* | 5/2019 | Schaye ............... B60Q 1/2603 |
| | | | 315/79 |
| 2020/0282895 | A1* | 9/2020 | Yi ............... F21S 41/143 |
| 2020/0343770 | A1 | 10/2020 | Baker et al. |

FOREIGN PATENT DOCUMENTS

| | | |
|---|---|---|
| GB | 1177969 A | 1/1970 |
| GB | 3228501 A | 10/2017 |
| GB | 2372323 A | 8/2022 |

\* cited by examiner

ENVIRONMENTALLY SEALED VISUAL DISPLAY ASSEMBLY AND PROCESS INCORPORATING INDIVIDUAL OR STACKED LED STRIPS, PROCESSOR AND ACCELEROMETER COMPONENTS

CROSS REFERENCE TO RELATED APPLICATIONS

The present application claims the priority of U.S. Ser. No. 63/439,955 filed Jan. 19, 2023.

FIELD OF THE INVENTION

The present invention relates generally to a visual front alert system (VFAS). More specifically, the present invention teaches a visual front alert system including an environmentally sealed visual display assembly incorporating any of individual or stacked arrangements of LED strips (such as including white and amber LED strips) combined with a panel or track design (either in-molded or sonic welded) and also incorporating the surge protection and motion control features.

BACKGROUND OF THE INVENTION

The prior art is documented with examples of visual alert systems, such as which can be mounted to a vehicle for notifying pedestrians and other drivers as to whether a subject vehicle is braking/decelerating.

A first example is set forth in U.S. Pat. No. 10,981,496 to Schaye, and which teaches a visual deceleration apparatus for indicating vehicle deceleration. A housing is disclosed which is visible from a front of the vehicle and which incorporates a printed circuit board, an electrical connection and an accelerometer for signaling a plurality of LEDs to instruct the braking condition of the vehicle. An associated method is disclosed for creating a lighting pattern on a light strip associated with the LEDs for instructing vehicle deceleration/braking.

US 2015/0323149 to Salter teaches a photoluminescent lighting apparatus vehicle taillight including a partially light transmissive layer and at least one light generating layer configured to substantially coat a portion of the transmissive layer. The light generating layer comprises a plurality of electrodes and a plurality of LEDs in a semiconductor ink disposed between the electrodes. The light generating layer is operable to emit an excitation emission. The taillight further includes at least one photoluminescent layer proximate at least one of the electrodes configured to convert the excitation emission to an output emission.

Takori, U.S. Pat. No. 11,524,628 teaches a notification device in a vehicle which enables a person outside the vehicle to be notified of a predetermined operating state of the vehicle by the light emission, and includes: a plurality of spot-shaped light sources arranged at intervals to follow an upper edge of a windshield; a reflecting part reflecting light from the light sources to a front; an outer lens transmitting therethrough the light heading toward the front from the reflecting part; and a housing. The outer lens has on at least one of front and rear faces thereof a fine concave-convex face diffusing the light transmitted through the outer lens.

Other known assemblies include each of the accessory brake light system of Tim Kao (U.S. Pat. No. 5,798,691), the vehicle accelerator and brake indicators of Song (US 2006/0125615), the advance warning system of Cheng (US 2006/0250229) and the vehicle acceleration/deceleration warning light of Tracy (U.S. Pat. No. 7,397,355). In each instance, a lighting assembly is incorporated into a housing of some type, which is mounted at a given location of a vehicle.

SUMMARY OF THE INVENTION

The present invention discloses a visual front alert system (VFAS), such as for instructing pedestrians or other drivers (collectively observers) as to the movement of a subject vehicle. In a particular and non-limiting application, the alert system indicates to the observer(s) located forward of the subject vehicle as to whether the vehicle is maintaining a given speed or is decelerating, which is further indicative of a braking condition.

The alert system is provided as a two-piece body or housing, such as which can include a plasticized material having any degree of flexibility. The housing exhibits any sort of elongated panel or track shape, such as without limitation can be integrated into a forward facing location of a vehicle not limited to a license plate holder, vehicle front grille, or the like. Without limitation, the assembly can be provided as such as an after-market adaptation to an existing vehicle which is secured to a physical exterior location and connected to a power source extending from the vehicle battery.

The housing can include any of a silicone molded or multi-piece sonically welded construction to enclose one or more LED strips, this in combination with associated circuitry including a motion detecting (accelerometer) component. Without limitation, the elongated track or housing can include any transparent, translucent or light transmitting forward facing surface overlaying the LED illuminating strips.

The LED strips can, in one non-limiting application, including each of a white and amber strip which extend the length of the housing, with the strips each having a plurality of illuminating elements on a forward facing surface. Also included are wiring connections extending to a PC board assembly (also PCBA) with built in accelerometer for illuminating the LED's based on the vehicle movement.

Without limitation, the individual LED strips can be subdivided into sub-pluralities of LED segments, which can be illuminated via signaling from the processor according to any alternating or succeeding pattern, such as in order to provide any animated pattern. The lighting patterns contemplated herein can further include the processor illuminating the LED's according to any single or multiple lights, flashing or illuminating intensity.

An electrical power supply is provided to the strip shaped body and, in a first application, includes additional connections extending between the PCBA and a battery of the vehicle. Powering options can also include connecting ITM (integrated toll module), OEM (original equipment manufacturer) and aftermarket devices to an OBD port (defined as a universal connector for accessing a vehicle's computer for running any tests or diagnostics) associated with the assembly. In a further application, a portable battery (including any of 12V, Lithium ion or Nickel Cadmium can be substituted for a dedicated hookup connection for powering the PCBA, accelerometer and LEDs.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
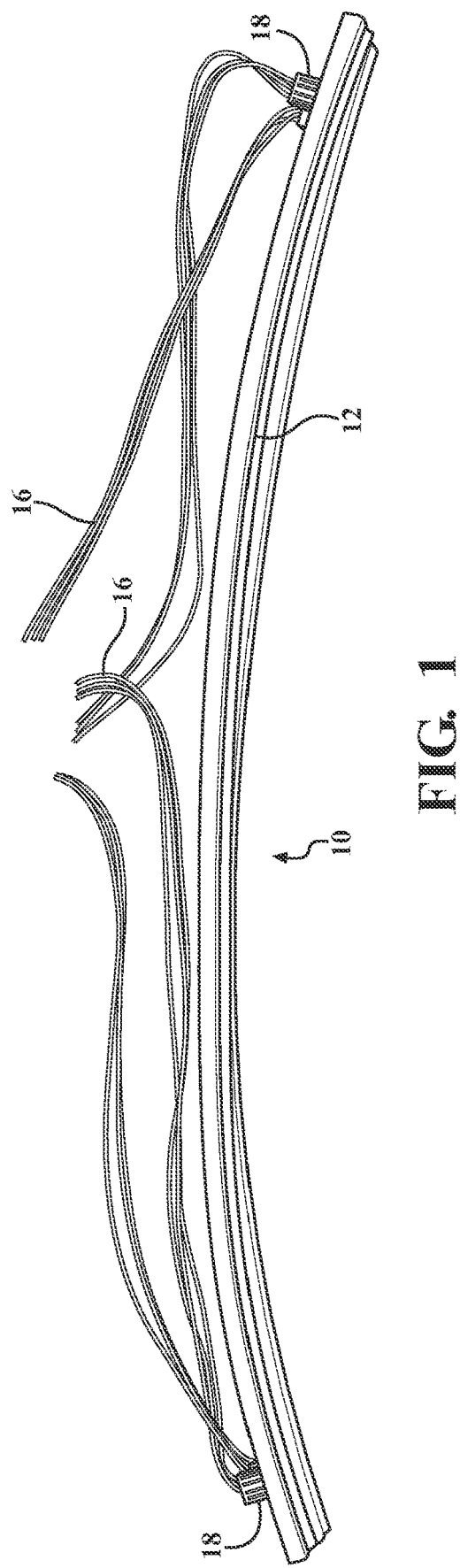
FIG. 1 is an environmental view of the visual display/vehicle alert system according to a non-limiting variant of the present invention secured to a forward facing location of a vehicle.
Figure 2:
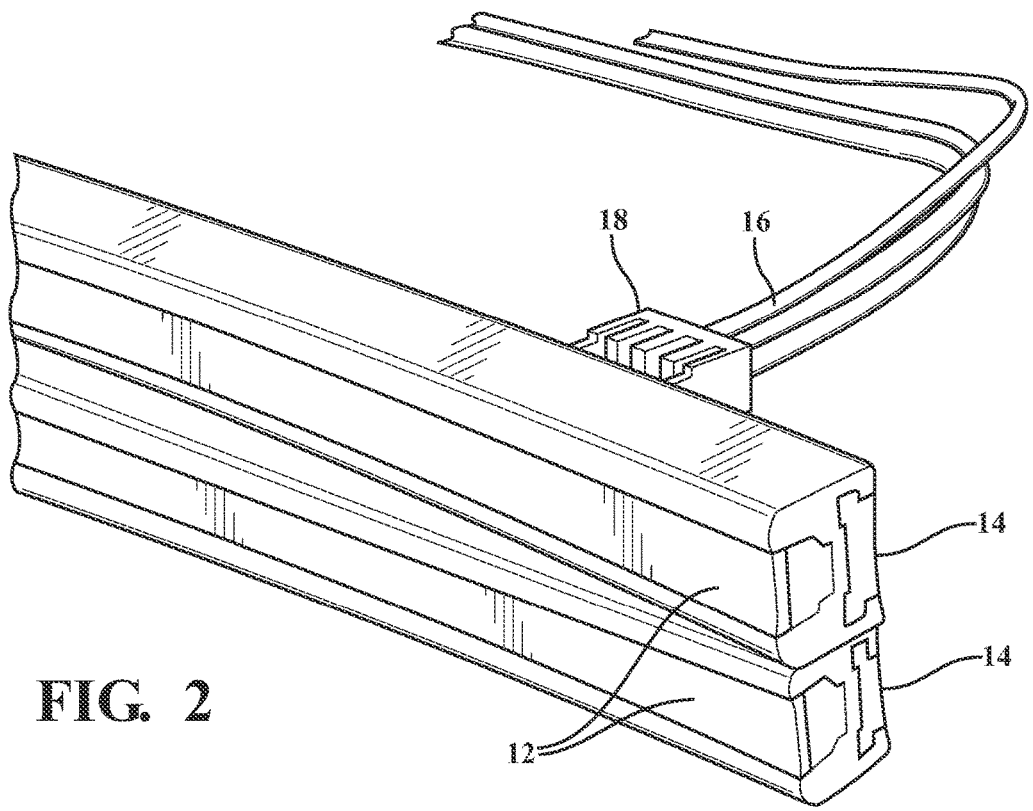
FIG. 2 is an enlarged view of the vehicle alert system of FIG. 1 and depicting a multi-piece housing for enclosing the LED strips with a light transmissive forward facing surface and including each of the PCBA board and accelerometer.

With reference to the attached illustrations, and initially FIGS. 1-2, the present invention discloses a visual front alert system (generally at 10) for instructing pedestrians or other drivers (collectively observers) as to the movement of a subject vehicle. As will be further described, the alert system is attached or incorporated into any of a forward facing location of the vehicle, such as including but not limited to a vehicle grille or adjoining license plate in an aftermarket type application, in order to indicate to observer(s) located forward of the subject vehicle whether the vehicle is maintaining a given speed or is decelerating/accelerating, this further indicative of either of a braking or other non-constant motion condition.

The alert system includes a main body 12, such as without limitation be constructed of a plasticized material having a four sided rectangular cross sectional shape and which can be flexible or rigid to varying degrees (hereinafter referenced as a semi-rigid material). Each of FIGS. 1 and 2 depicting a pair of elongated bodies 12 depicted in a stacked arrangement with the understanding that the elongated track shape of the body can be varied in any fashion desired. The illustrated embodiment depicts the body 12 defining an interior for receiving the circuitry and motion control components (e.g. including each of PCBA and accelerometer components) along with the illuminating elements, and over which is sonically welded or otherwise secured a light transmitting (this including any of transparent or translucent) cover 14, further best shown in FIG. 2. The enclosed circuitry also includes other functionality not limited to thermal management, mechanical/electrical functions and the like.

Any of a single or plural stacked arrangement of illuminating elements (see as will be further described in reference to FIGS. 3-5) is integrated within the elongated body such that illumination of the elements and is visible through the forward facing translucent or transparent cover 14. The illuminating elements can, without limitation, include one or more individual strips of such as LED elements (the term LED or illuminating element being interchangeably referenced), with wiring connections (see harness at 16 in FIGS. 1-2) including one or more connectors 18 secured to the plastic main bodies 12 and communicated to a processor (PCBA), not shown, incorporated into the assembled body for operatively controlling the illuminating elements.

An electrical power supply is provided to the strip shaped body and, in a first application, includes additional connections extending between the PCBA and a battery of the vehicle (not shown) connected to a remote end of the harness 16. In a further application, a portable battery (not limited to any of 12V, Lithium Ion or Nickel Cadmium) can be substituted for a dedicated hookup connection for powering the PCBA, accelerometer and illuminating elements/LEDs.

Powering options for the assembly also contemplate utilizing the vehicles onboard diagnostic port (OBD), which is again defined as a location where a diagnostic computer is connected, and operates to diagnose and read the trouble codes from the vehicle. The most common location for the OBD port is under the steering wheel on the driver's side. Another common place is near the center console panel, and sometimes even under the dashboard on the passenger side. The present invention also contemplates connecting any of ITM (Information Technology Management), OEM (Original Equipment Manufacturer) and aftermarket devices to the OBD port, such as which can also interface with the present assembly in order to increase both its functional and operational applications.

As is further known, the LEDs are a subset of electroluminescent lamps, generally defined as devices which convert electrical energy into light or luminescence, with the term luminescence generally associated with solids that generate light. In the case of electroluminescence, an electric field (voltage) applied to a thin phosphor layer produces light. Without limitation, the LEDs can be substituted with any other suitable illuminating elements within the scope of the present invention.

As is further understood, the PCBA component can incorporate an accelerometer component, which can also be incorporated directly into the PCBA 18. As best shown in the illustrations provided (again FIGS. 1-2), the wiring connections 16 are split into subset pluralities extending through each of individual illuminating strips, it being understood that additional embodiments can be substituted for that shown and contemplate any of the use of a single connecting strip, other multiple connecting strips or of substituting the wiring connections and associated connecting strips entirely in favor of any wireless connection not limited to Bluetooth®, NFC (near field communication) or other short range wireless connectivity technology configured between the PCBA and accelerometer to the individual LEDs/illuminating strips.

In this fashion, the PCBA instructs the visual output (illumination) of some or all of the LEDs/illuminating elements based on the vehicle movement sensed by the motion control circuitry/accelerometer. As is further known, the accelerometer is a device that measures the vibration, or acceleration of motion of a structure. The force caused by vibration or a change in motion (acceleration) causes the mass to "squeeze" the piezoelectric material, which produces an electrical charge that is proportional to the force exerted upon it. Since the charge is proportional to the force, and the mass is a constant, then the charge is also proportional to the acceleration.

In this manner, an accelerometer works using an electromechanical sensor to measure dynamic acceleration, defined as non-uniform acceleration forces when compared to its previous state. The theory behind accelerometers is that they can detect acceleration and convert it into measurable quantities like electrical signals.

In one non-limiting operation, the PCBA instructs a first visual output by the illuminating elements representative of a first steady or accelerating movement condition (this generally representing to the forward located observer that the vehicle is traveling a steady motion), with a second instructed visual output further representative of a decelerating or braking condition of the subject vehicle (additional visual outputs can also represent other non-constant travel conditions such as for vehicle acceleration).

The visual outputs envisioned by the present invention can include a number of different representations presented by the LEDs or other suitable electroluminescent elements, a first of which can include providing the first output in a first color (such as including but not limited to white), with the second output provided in a second color (such as further including but not limited to yellow or amber). It is further envisioned and understood that the first and second visual representations can be provided according to any of varying illumination intensities, flashing patterns, or the like, such further utilizing any of multiple different colors or a single color.

Figure 3:
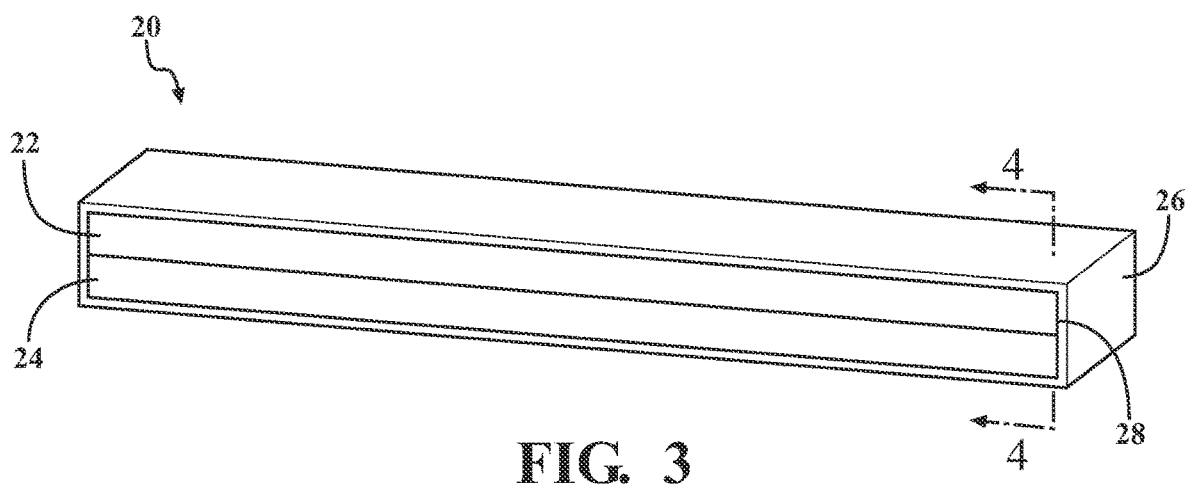
FIG. 3 is an illustration of a further variant of visual display assembly with stacked LED strips.

With reference now to FIG. 3, an illustration is shown generally at 20 of a further variant of a visual display assembly having a housing containing any individual or stacked pair of stacked LED strips (see white at 22 and amber at 24). As previously described, the housing can again include a two piece arrangement with a cavity defining and multi-sided elongated plastic base (at 26) over which is sonically welded or otherwise secured a further elongated plastic translucent or transparent cover 28.

Figure 4:
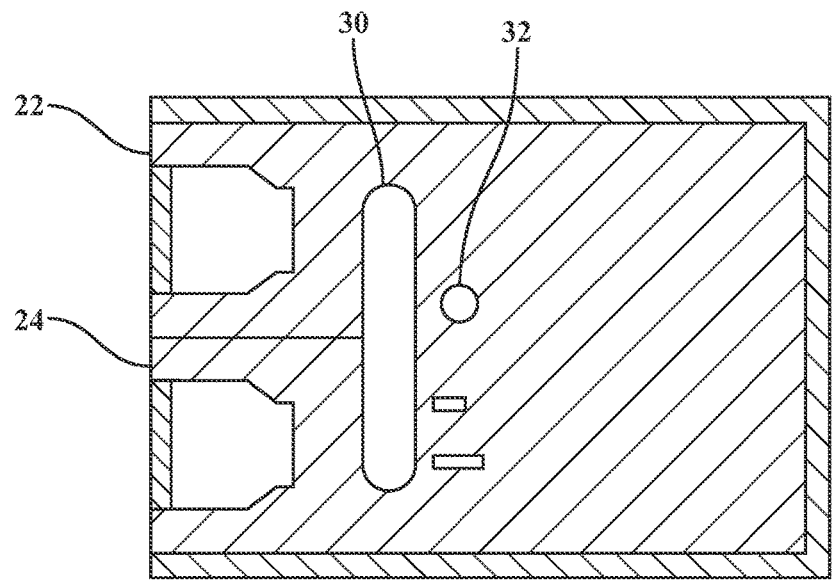
FIG. 4 is a side cutaway view taken along line 4-4 in the environmentally sealed assembly of FIG. 3 and depicting the stacked LED strips in combination with the circuitry components integrated into the housing.

As further shown in the side cutaway view of FIG. 4, this taken along line 3-3 shown in FIG. 3, the sealed assembly depicts the stacked LED strips 22/24 in combination with the circuitry components integrated into the housing including the PCBA (at 30) incorporating the motion control circuitry/accelerometer component (further representatively depicted at 32). Without limitation, additional envisioned variants contemplate substituting a two-piece sonically welded construction with a silicone injection molded arrangement encapsulating the LED strips 22/24 and associated PCBA/accelerometer components 30/32.

Figure 5:
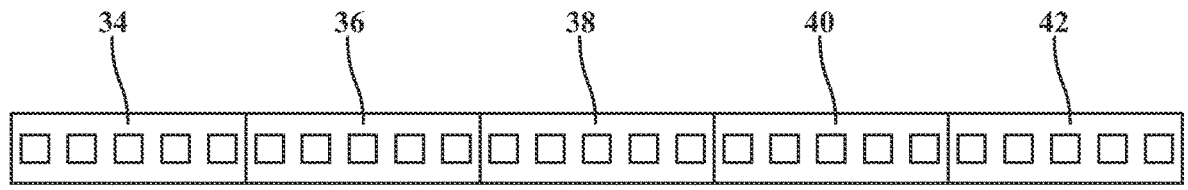
FIG. 5 presents an illustration of a plurality of sub-divided LED segments incorporated into each of the strips.

FIG. 5 presents an illustration of a plurality of sub-divided LED segments (see as represented at 34, 36, 38, 40 and 42), such as which can be incorporated into each of the strips 22/24. In one non-limiting application, the individual segments are illuminated via signals from the processor (PCBA) 30 according to any alternating or succeeding pattern, such as in order to provide any animated scheme or pattern according to any of a single (e.g. white) or multiple (e.g. white/amber colors are illuminated based on the inputs delivered to the motion control circuitry. The outputted lighting sequences can also include the segments being successively illuminated in a following or tracking manner, such as in a given direction, again in response to a given input condition from the PCBA/accelerometer, in order to instruct the forward located observer as to the travelling condition of the vehicle. The lighting patterns contemplated herein can further include, without limitation, the processor illuminating the LED's according to any of single or multiple lights, flashing or illuminating intensity.

A corresponding process for creating a visual front alert system attached to a vehicle includes each of the steps of providing each of a plurality of illuminating elements configured in a strip and a processor incorporating a motion control circuitry, forming a body around the illuminating elements and processor, communicating a power supply operating the processor and illuminating elements and, in response to a travel condition of the vehicle by causing the motion control circuitry, outputting a signal to the processor which is representative of the vehicle movement for signaling to the illuminating elements to generate a visual output corresponding to the signal. Additional steps including forming the body around the illuminating elements and processor, this further comprising securing a light transmitting cover over a multi-sided and cavity defining base. Other steps include injection molding a silicone material around the processor and illuminating elements and providing a wire harness extending from a battery of the vehicle and connecting an end of the harness to a location of the body.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first". "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A visual front alert system attached to a vehicle for instructing observers located forward of the vehicle as to movement of the vehicle, said system comprising:
a body adapted to being attached to a forward location of the vehicle and incorporating a plurality of illuminating elements configured in a strip extending substantially the length thereof and communicating with a processor also integrated into said body and incorporating a motion control circuitry, said strip further including a stacked LED strips exhibiting first and second colors;
a light transmitting cover sonically welded over said LED strips along an open front of said body;
a power supply operating said processor, motion control circuitry and illuminating elements and including first and second external wiring connections extending to opposite ends of said body via connectors;
in response to a travel condition of the vehicle, said motion control circuitry outputting a signal to said processor which is representative of the vehicle movement; and
said processor in turn signaling said illuminating elements to generate a visual output corresponding to said signal.

2. The visual front alert system of claim 1, said visual output further comprising a first output representative of a steady or accelerating motion of the vehicle, and a second output further representative of a decelerating or braking condition of the vehicle.

3. The visual front alert system of claim 1, further comprising said power supply including additional connections extending between said processor and a battery of the vehicle including, without limitation, accessing a vehicle onboard diagnostic port.

4. The visual front alert system of claim 1, further comprising said body being constructed of a plasticized material.

5. The visual front alert system of claim 4, said body further comprising a silicone injection molded material which is formed around said illuminating elements, processor and motion control circuitry.

6. The visual front alert system of claim 1, each of said LED strips further comprising subdivided segments for providing said visual output according to any of a following or tracking pattern.

7. A process for creating a visual front alert system attached to a forward location of a vehicle for instructing observers as to movement of the vehicle, said system comprising:
providing each of a plurality of illuminating elements configured as a stacked pair of LED strips having first and second colors and a processor incorporating a motion control circuitry;
forming a body around the illuminating elements and processor;
sonically welding a light transmitting cover over the LED strips along an open front of the body;
communicating a power supply operating the processor, motion control circuitry and illuminating elements and including providing first and second wiring connections extending to opposite ends of the body via connectors; and
responding to a travel condition of the vehicle by causing the motion control circuitry to output a signal to the processor which is representative of the vehicle movement for signaling to the illuminating elements to generate a visual output corresponding to said signal.

8. The process according to claim 7, the step of forming the body around the illuminating elements and processor further comprising injection molding a silicone material around the processor and illuminating elements.

9. The process according to claim 7, said step of communicating a power supply further comprising providing a wire harness extending from a battery of the vehicle and connecting an end of the harness to a location of the body.

10. A visual front alert system attached to a vehicle for instructing observers located forward of the vehicle as to movement of the vehicle, said system comprising:
a silicon injection molded body formed around a stacked pair of LED strips exhibiting first and second colors extending substantially the length thereof and communicating with a processor also integrated into the molded silicone body and incorporating a motion control circuitry;
a light transmitting cover sonically welded over said LED strips along an open front of said silicone injection molded body;
a power supply operating said processor, motion control circuitry and illuminating elements and including first and second external wiring connections extending to opposite ends of said body via connectors;
in response to a travel condition of the vehicle, said motion control circuitry outputting a signal to said processor which is representative of the vehicle movement; and
said processor in turn signaling said illuminating elements to generate a visual output corresponding to said signal.

11. The visual front alert system of claim 10, said visual output further comprising a first output representative of a steady or accelerating motion of the vehicle, and a second output further representative of a decelerating or braking condition of the vehicle.

12. The visual front alert system of claim 10, further comprising said power supply including additional connections extending between said processor and a battery of the vehicle including, without limitation, accessing a vehicle onboard diagnostic port.

13. The visual front alert system of claim 10, each of said LED strips further comprising subdivided segments for providing said visual output according to any of a following or tracking pattern.

* * * * *